United States Patent

[11] 3,582,161

| [72] | Inventor | Arthur F. Hudson |
| | | Box 1025, Huntington, Ind. 216750 |
| [21] | Appl. No. | 839,263 |
| [22] | Filed | July 7, 1969 |
| | | Division of Ser. No. 622,528, Mar. 13, 1967, Pat. No. 3,469,893. |
| [45] | Patented | June 1, 1971 |

[54] BEARING CONSTRUCTION
2 Claims, 17 Drawing Figs.

[52] U.S. Cl. .................................................. 308/6
[51] Int. Cl. ............................................. F16c 17/26
[50] Field of Search ................................ 308/6, 6 B, 6 C

[56] References Cited
UNITED STATES PATENTS

| 3,219,398 | 11/1965 | Anderson | 308/6 |
| 1,005,055 | 10/1911 | Miller | 308/3.8 |
| 2,173,587 | 9/1939 | Huffman | 308/6 |
| 2,342,302 | 2/1944 | Rubissow | 308/6X |
| 2,420,296 | 5/1947 | Bishop | 308/6B |
| 2,526,518 | 10/1950 | Turrettini | 308/6 |
| 3,054,648 | 9/1962 | Bauer | 308/6 |
| 3,198,588 | 8/1965 | Cashman | 308/6 |

FOREIGN PATENTS

| 1,277,845 | 12/1961 | France | 308/6C |
| 116,886 | 7/1946 | Sweden | 308/6B |

*Primary Examiner*—Manuel A. Antonakas
*Attorney*—John A. Young

ABSTRACT: A bearing construction is provided in which the sleeve or cage receives the bearing elements and has spaced pins or stops in combination with both the cage and the surrounding bushing so that the available stroke length can be increased, being a function of both movement of the bearing elements and the cage for the bearing elements.

PATENTED JUN 1 1971

INVENTOR
ARTHUR F. HUDSON
by JEFFERS & YOUNG
ATTORNEYS

INVENTOR
ARTHUR F. HUDSON
by JEFFERS & YOUNG
Attorneys

INVENTOR
ARTHUR F. HUDSON
by JEFFERS & YOUNG
ATTORNEYS

INVENTOR
ARTHUR F. HUDSON
by JEFFERS & YOUNG
ATTORNEYS

PATENTED JUN 1 1971 3,582,161

INVENTOR
ARTHUR F. HUDSON
by JEFFERS & YOUNG
ATTORNEYS

3,582,161

BEARING CONSTRUCTION

This application is a Divisional Application of Ser. No. 622,528, filed Mar. 13, 1967, and entitled "Improved Bearing Construction" now issued as U.S. Pat. No. 3,469,893.

This invention relates to an improved bearing construction, and more particularly to a bearing construction adapted for use in supporting movable linear loads. This application is not considered to be a limitation, but only a statement of an example of use which can be made of the present invention.

In conventional bearing constructions, one member is made relatively movable with respect to the other member by means of a rolling or sliding contact which permits such movement in as frictionless a manner as is practical while supporting required load condition. The present invention is of the antifriction, or roller bearing type, and one of its principal objects is to increase the stroke or limit of movement while maintaining the bearing surfaces in functional position for as long an interval as possible. In conventional linear bearing construction the roller or ball bearing elements are retained in relatively fixed relationship, one with respect to the other, by means of a cage, which may take the form of a retainer sleeve, links or other suitable members while they are in rolling engagement with the coacting matching bearing elements. The bearings may be surrounded by a bushing or other load-support means which rests on the plurality of bearing elements; within the retainer sleeve is slidably mounted a shaft, a guide pin, leader pin or other surface. These structural members may take different forms, depending upon the application of the invention, in which case the inner and outer opposing surfaces (shaft and sleeve) can be parts of vertical or horizontal members and can be found in numerous locations and in relative relations to each other depending upon the particular apparatus.

It has been found that the extent of travel of the bearing components is necessarily limited by the ability of the bearing cage to move within the bushing. The stroke length is thereby defined by the physical dimensions of the sleeve. This is an undesirable parameter unrelated to the necessities of many uses. In the present invention, it is possible to increase the effective stroke length of the machine, and make it less related to the physical dimensions of bushing, bearing retainer and other design parameters by virtue of making the bearing retainer or the bushing with two keyways, each keyway having a stop member and each stop member to be at opposite ends of bearing retainer or bushing; the stop member of the other element (bushing or bearing retainer) assembled into the mating keyway permits one stop to engage the bottom of its containing keyway in one extreme position and the other stop will engage the bottom of the other containing keyway during the reentry of the bearing retainer back into the bushing on through the bushing until this stop member engages the stop member near the end of that keyway.

It is another important object of the present invention to produce a novel bearing combination which effectively increases the available stroke of a machine by virtue of utilizing a relatively movable bearing-and-cage retainer, which adds effective stroke length without increasing the physical dimensions of the bearing elements of the bearing assembly. In this way, it is possible to reduce the cost of the bearing construction and to increase its efficiency because of maintenance considerations and the like.

Another object of the present invention is to provide a novel bearing construction in which the bearing components provide full bearing support at that phase of machine operation in which loading is maximum, and provide relatively less bearing support when the machine operation does not involve heavy loading at its extreme positions. Generally, it is in these extreme positions that the machine is used for indexing or other relatively low-loading operations which do not necessitate a full bearing support.

Another object of the present invention is to provide a novel bearing combination in which the bearing elements can either be roller bearing elements, ball bearing elements, or irregularly formed bearing elements, as design considerations dictate, but all of which are available for increasing the effective stroke length.

It is an important feature of the present invention that stroke length can be increased without in any way diminishing load factor sustainable by the bearing elements during the working portion of the stroke, that is, the load factor may continue as before and the bearings located in order to provide maximum bearing support while at the same time, permitting such increase in length of stroke at the extremes of the travel, wherein load support is not essential to as great a degree as during midstroke of the machine.

Another novel purpose of the present invention is to control the maximum load carrying portion of the opposing forces and overtravel at either or both ends of the stroke by proper positioning of a stop member or stop members.

Another feature of the present invention concerns caged linear bearing elements which will not move rotatably around a shaft except under extreme force capable of destroying the contacting surfaces, however, at the extreme ends of each stroke, with the bearing elements extended beyond the bushing, an angular keyway with stop member engaged, will rotate the bearing retainer sufficiently to cause the bearing elements to track a different portion of the opposing forces during the return stroke, with angular positioned keyway leading to a separate return keyway positioned accordingly.

It is an important feature of the present invention that the bearing elements are adapted for receiving load, not only radially but tangentially as well, and yet have the ability to retain their correct relative spacing during use.

Other objects and features of the present invention will become apparent from a consideration of the following description, which proceeds with reference to the accompanying drawings, wherein.

Figure 16:
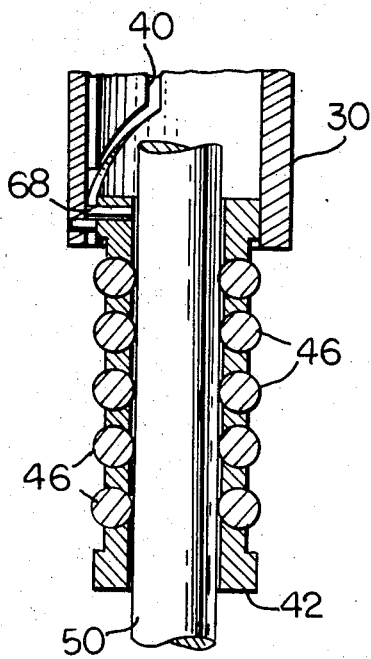
Figure 17:
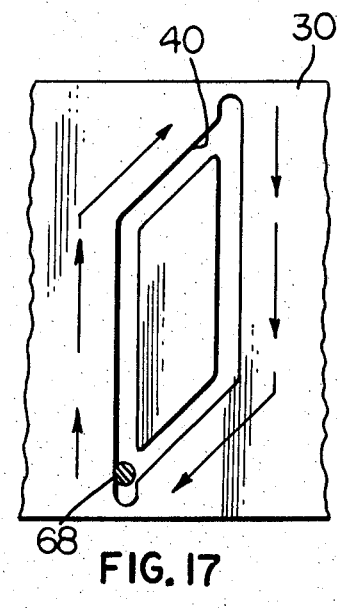

FIG. 16 is a sectional view of bearing elements using cam-and-cam follower means for indexing the sleeve angularly so that the bearing elements will not track over the same interior surface of the sleeve; and FIG. 17 illustrates the path of the bearing sleeve as it is indexed for back and forth movements whereby the bearing elements move across different surfaces of the opposed bearing support surfaces.

Figure 1:
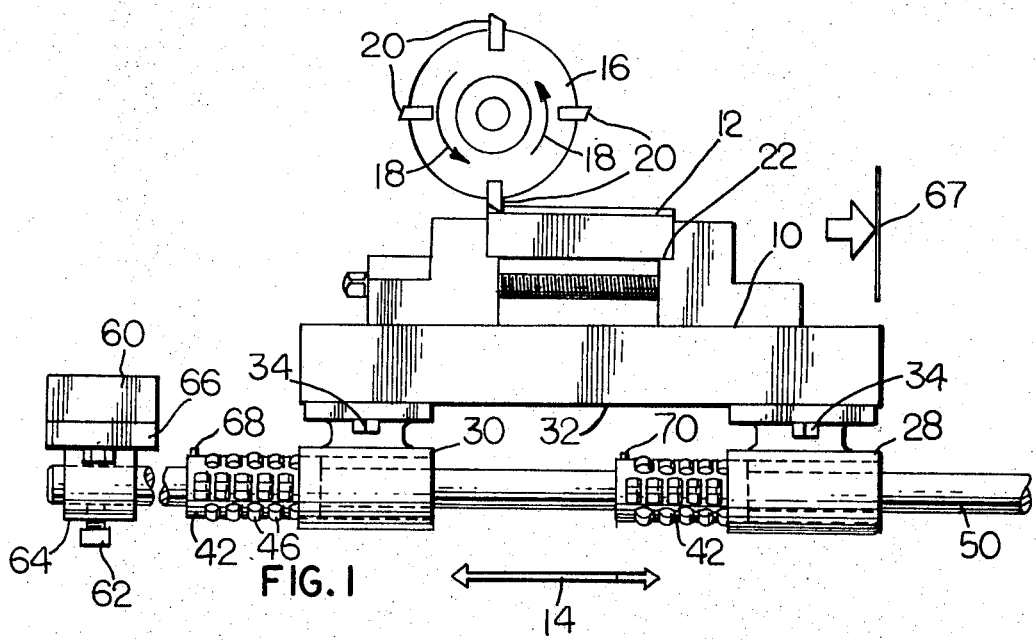
FIG. 1 is a front elevation view of a machine which incorporates the bearing elements constructed in accordance with the present invention.

The interior surface of the bore 36 (FIG. 5) provides the bearing support by which the work load and work table are vertically supported (FIG. 1). Within the bore 36, is a retainer sleeve or cage 42 having a plurality of spaced bearing pockets 44, (FIGS. 3, 6, 7) each containing a bearing element 46, details and construction of which are fully set forth and disclosed in my copending application Ser. No. 502,824, titled Improved Bearing, filed Oct. 23, 1965. Each bearing element (FIGS. 5,6) has a concave central bearing section 48 which is proportioned to provide linear contact with a support shaft 50 which is held in a suitable manner to provide vertical support for the entire assembly and also to direct the line of movement of the work table 10.

At the opposite ends of each bearing element are convexly contoured bearing surfaces 51 and 52 (FIGS. 5,6) which engage the inner surface of the bore 36 of sleeve 28, and there is thus provided antifriction type roller bearing engagement between the shaft 50 and the sleeve 28.

The limits of movement of the work table are defined by engagement of the work table with spaced stops 60, one of which is shown in FIG. 1, the stop 60 being adjustable along the length of the shaft 50 and then clamped in place in some suitable manner as by a threaded anchor bolt 62 or the like, which is passed through collar 64 and bears against the shaft 50 to hold abutment surface 66 in place to receive the impact of the work table and define its maximum travel in one direction. A companion stopping point 67 is at the other end of the shaft 50 to define the maximum travel of the work table in the opposite direction.

At the limits of travel for the work table, the bushing 28 or 30 tends to move beyond its associated sleeve 42, but the two parts are held together by means of spaced pins 68 and 70 on the retainer sleeve 42 which bottom at the ends of slots 38 or 40 to cause the bushing 28 and bearing cage 42 to move in unison with each other.

At the position of the components in FIG. 1, the work table has moved its maximum distance to the right and the working tools are clear of the work piece 12. At this stage of machine operation there is relatively little loading on the bearing and therefore the only work that the bearings are required to perform is to sustain the weight load of the carriage, work piece, and work table. This loading is relatively small as compared with the loading which occurs when the tool bears against the face of the work piece to perform the various machining operation. At the maximum travel indicated in FIG. 1, the bushing 28 has traveled beyond the retainer sleeve or cage 42 and pin 68 thereof has bottomed against the end of slot 40 (FIG. 3) within the bushing, thus causing the two parts to move thereafter in unison. In other words, the sleeve and the bushing are prevented from moving entirely apart, one relative to the other, and although their extent of interfit is relatively slight, it is nevertheless sufficient to meet the relatively lower order of supportive loads required for the machine at this stage of machine operation.

Figure 2:
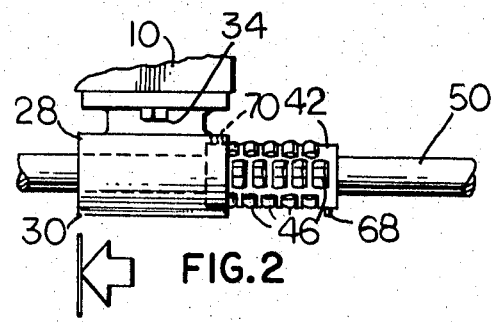
FIG. 2 illustrates the bearing elements in the machine position extremely opposite that of the machine position in FIG. 1.

When the machine reverses operation, that is, the work table moves to the left from the position of FIG. 1 to that of FIG. 2, the bushing 28 telescopes over the retainer sleeve 42 and the entire machine continues to move toward the left, while the bushing 28 slides over the retainer sleeve 42 and the retainer sleeve 42 in turn moves along the length of the rod 50. The carriage movement is a combination of both the movement of the bushing relatively to the sleeve and of the sleeve relatively to the rod, and since both motions are additive, it is possible to provide a substantial working stroke for the machine with a relatively small dimension of sleeve and bushing. Consequently, there is a substantial cost saving and space saving in that a relatively small bearing can be utilized for achieving a substantial stroke length for a machine. Before one of the tools 20 on the head 16 comes into contact with the work piece 12, the machine will move along its stroke so that a major portion of the bushing has moved over the retainer sleeve or cage and thus the two parts are interfitted to a greater extent than indicated in FIG. 1 in order that the higher normal loads which occur when the tool is brought against the work face, can be sustained.

Figure 14:
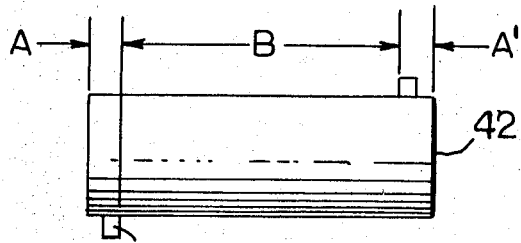
FIG. 14 is a detail view of a bushing usable with the bearing elements and cage of FIG. 15 and having dimensions indicated thereon.
Figure 15:
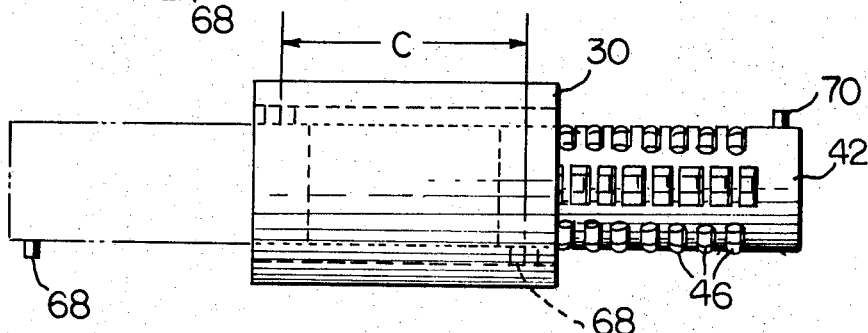
FIG. 15 shows the bushing assembled onto a sleeve or cage and in full line the parts are indicated in one extreme position and in dotted line the cage is shown in an opposite extreme position.

Referring to FIGS. 14 and 15, the total travel provided the work table equals the lengths of $(A+B)+C+(B+A')$ in lieu of the usual $B+C$ length. Obviously, this greater stroke length is of great advantage in obtaining improved machine operation at a lower bearing cost.

When the bearing must sustain heavier loads the bushing and retainer sleeve are fully telescoped. When the machine approaches its maximum stroke length and there is little or no work being performed, and it is only the weight of the machine parts which must be sustained, the bushing and retainer sleeve are moved farther out with respect to each other and the lower orders of load may be easily sustained within the limitations of the bearing parts, while still permitting the described increase in machine stroke necessary to carry the work piece 12 beyond the tool 26 so that the carrier 16 can be indexed.

In no event, can the bushing 28 move beyond the end of the sleeve 42 because one or the other of the pins 68, 70 will bottom against the end of its respective slot 38, 40 wherein it is received, thus limiting the travel of the bushing beyond the bearing retainer sleeve and thereby holding the two parts together.

The bushing can move from one position (FIG. 1) at the extreme rightward movement of the apparatus to a second position (FIG. 2) at the opposite limit of stroke length of the apparatus and without in any way separating the interfitted relationship of the retainer sleeve and bushing.

Figure 4:
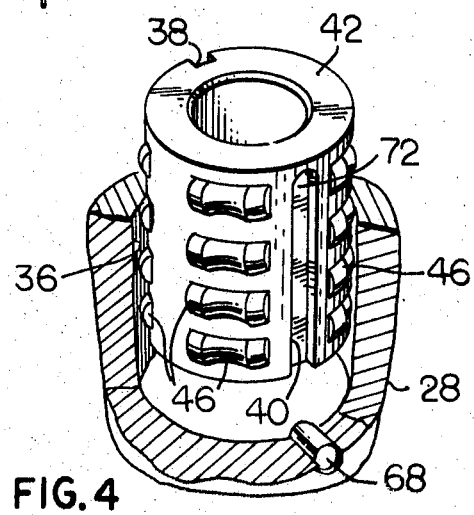
FIG. 4 is an isometric detail view illustrating the retainer sleeve, bearing elements and bushing with the stop pin being located in the bushing rather than in the retainer sleeve.

Referring next to the embodiment of FIG. 4, it should be noted that the retainer pin 68 instead of being mounted on the retainer sleeve, can also be mounted on the bushing and move within a slot 72 contained in the retainer sleeve and such arrangement is possible without in any way varying any of the other construction features of the invention. In other words, the location of the stop pin 68 can be in either the retainer sleeve or the bushing and such interchangeability is possible without affecting the basic operation of the invention. In both instances, the pin 68 will bottom at the end of its complementary slot.

Figure 5:
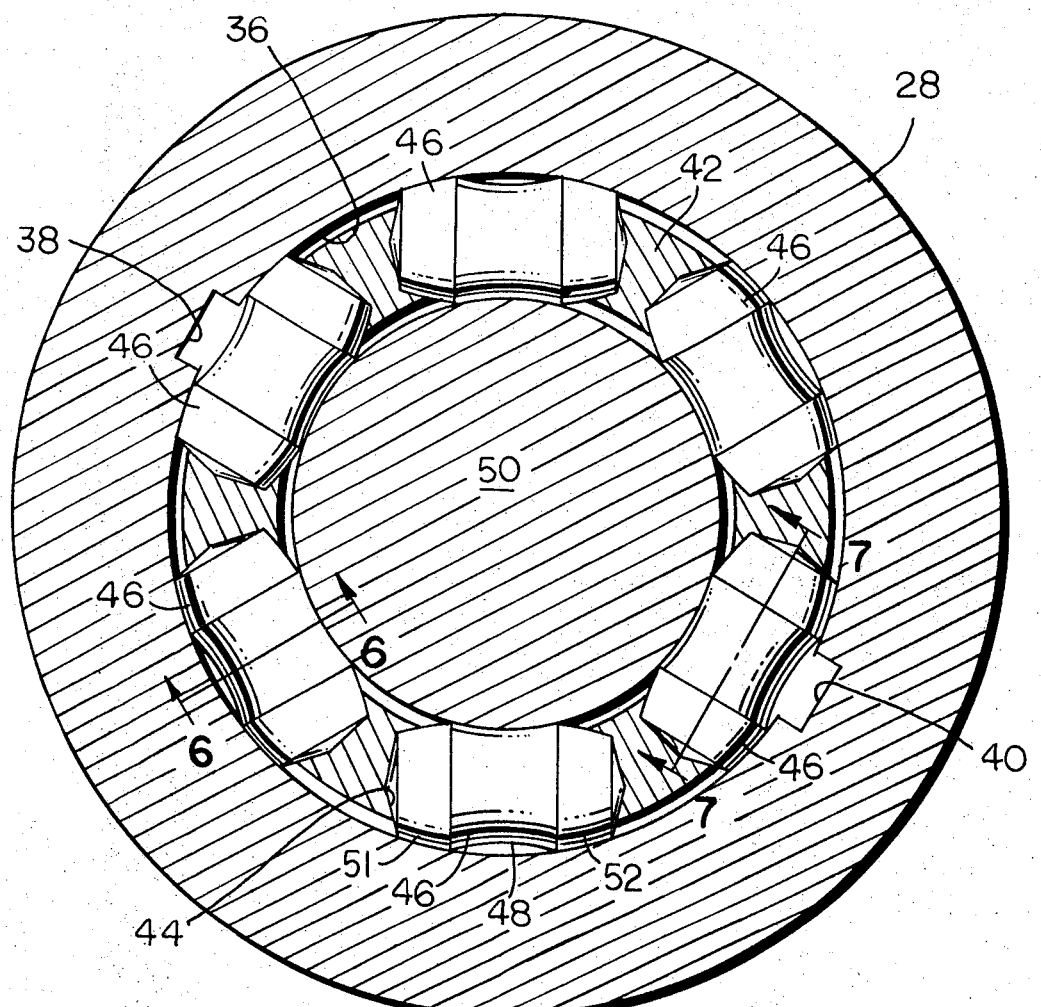
FIG. 5 is an enlarged sectional view taken on line 5-5 of FIG. 3.
Figure 6:
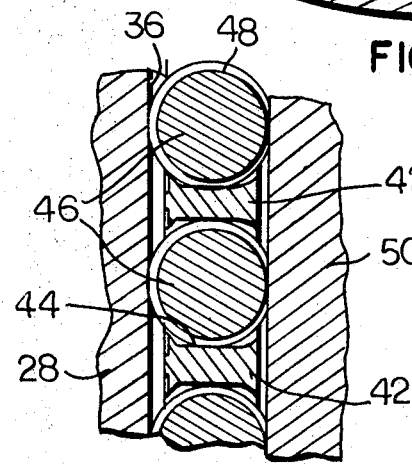
FIG. 6 is a sectional view taken on line 6-6 of FIG. 5.
Figure 7:
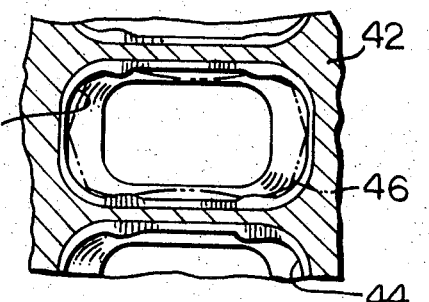
FIG. 7 is a sectional view taken on line 7-7 of FIG. 5.
Figure 8:
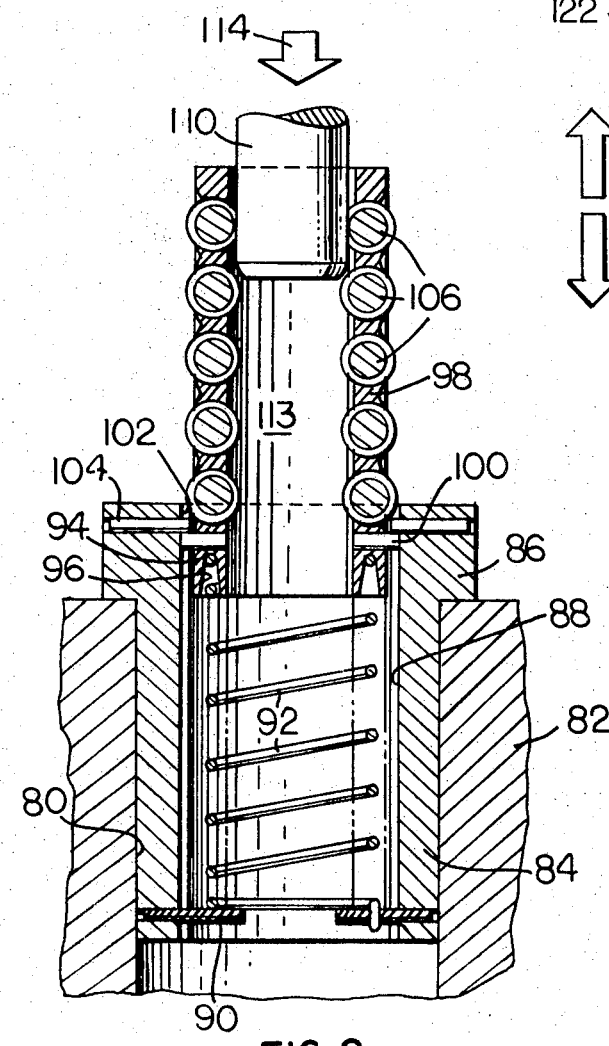
FIG. 8 illustrates the invention in which the bearing is combined with a support wherein the shaft, guide pin, or the like, is movable within a dead end opening.

Referring next to the embodiment of FIG. 8, there is mounted within a blind opening 80 of a support member 82 a bushing 84 having a flange 86 bearing against the open end of blind opening passage 80. Within bore 88 is a snap ring 90 and a caged spring 92 which is compressed between snap ring 90 and an end wall 94 having a recess 96 to receive the end coil of spring 92. The compressed spring urges retainer sleeve 98 outwardly until its end stop pins 100 engage snap ring 104 mounted in flange 86 and extending into the bore 88. Engagement of stop pins 100 with snap ring 104 limits the outward movement of the sleeve 98. Within the sleeve are a plurality of spaced bearing elements 106 of the same configuration as indicated in FIGS. 5, 6 and 7, the bearing elements being spaced apart but individually mounted for free rotational movement to provide antifriction roller bearing engagement with the shaft 110 which moves within passage 113 of retainer sleeve 98.

In operation, the bushing 84 is relatively stationary and plunger 110 moves downwardly from the position shown in FIG. 8, such movement being relative to the sleeve 98, the sleeve 98 being in turn movable relative to the bushing 84. The total available travel for the plunger 110 is the movement of the plunger 110 relative to the sleeve 98 and of the sleeve 98 relative to the bushing 84. Movement of the sleeve 98 relative to the bushing causes compression of the spring 92 so that when movement of the plunger 110 is reversed from that indicated by the arrow 14, the compressed spring 92 will return the sleeve 98 to the position shown in FIG. 8 wherein stop pins 100 engage the snap ring 104. This way, the available stroke length for the shaft can be repeated.

Figure 10:
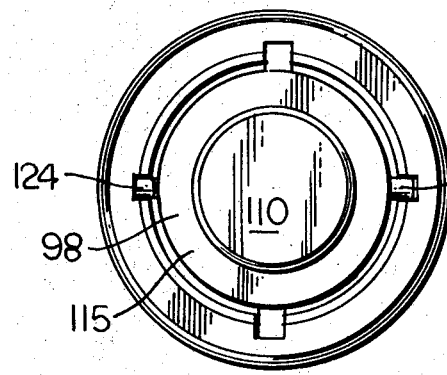
FIG. 10 is an end view looking in the direction of the arrows 10-10 in FIG. 9.
Figure 9:
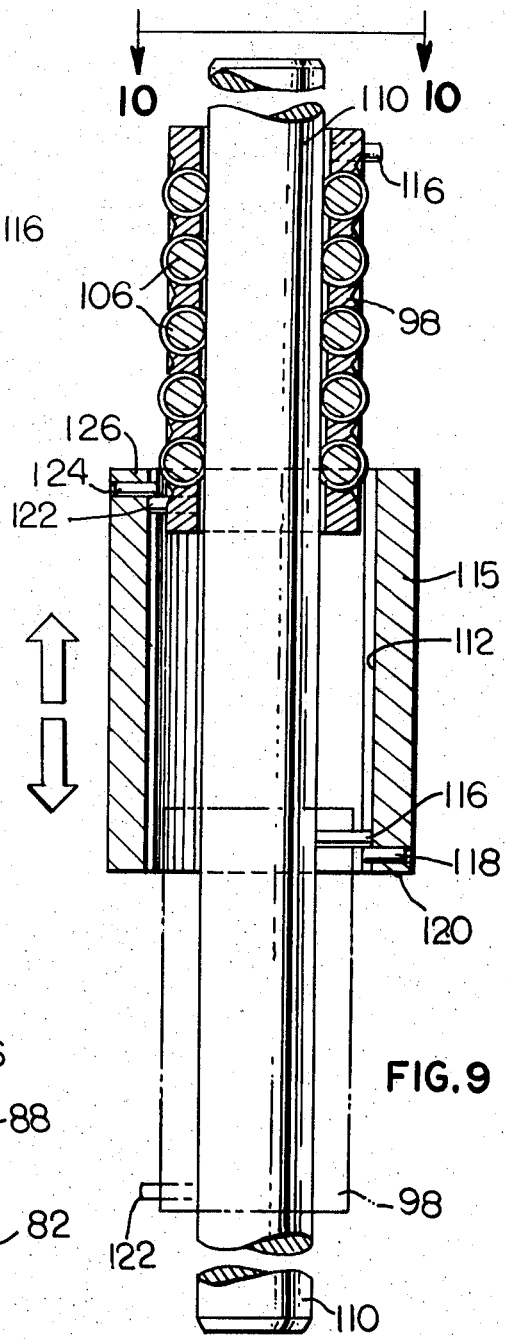
FIG. 9 illustrates the invention wherein the bearing retainer sleeve is illustrated at its uppermost position in full lines and its other extreme position in dotted lines, and with four stops as compared with the two stops illustrated in FIGS. 3 and 4.

Referring next to the embodiment of FIGS. 9 and 10, the bore 80 in the mounting member 82 can be made a through opening in which case, the retainer sleeve 98 is proportioned to pass freely through the entirety of bore 112 in bushing 115 the limits of downward travel, being determined by engagement of pin 116 with stop 118 at the one end 120 of the bushing 115 and by engagement of pin 122 with stop 124 at the opposite end 126 of a bushing 115. The limits of travel of the plunger 110 are determined by a composite of the movements of the plunger relatively to the sleeve 98 and of the sleeve 98 relatively to the bushing 115.

Figure 3:
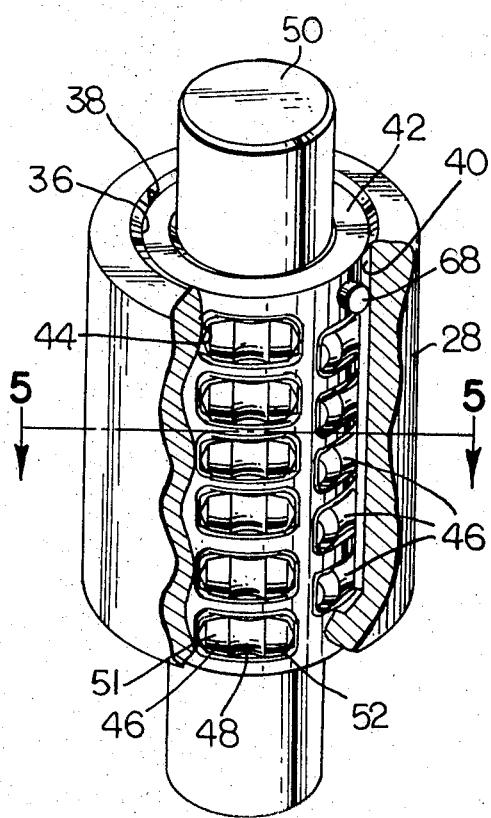
FIG. 3 is an isometric detail view of the bearing, with the bushing broken away to illustrate the bearing elements and retainer sleeve.

The advantages of the embodiment of FIG. 9 are the same as described in the embodiment of FIGS. 1—3, it being understood from FIG. 10 that as many as four complementary stops (FIG. 10) and stop pins are useable in place of diametrically disposed stop pins.

Figure 11:
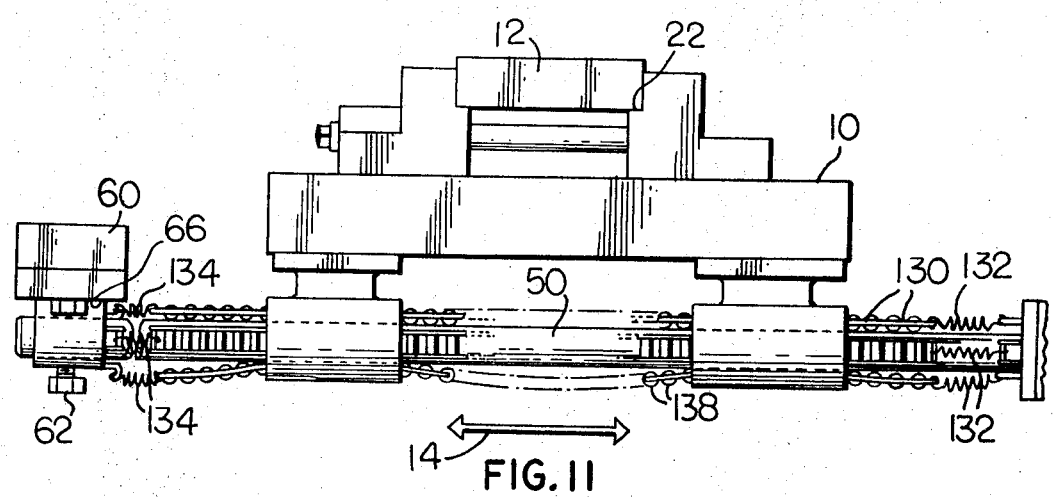
FIG. 11 illustrates a machine in combination with a plurality of bearing elements which are held in spaced relationship by means of articulated linkages which serve to hold the bearing elements instead of a retainer sleeve.
Figure 12:
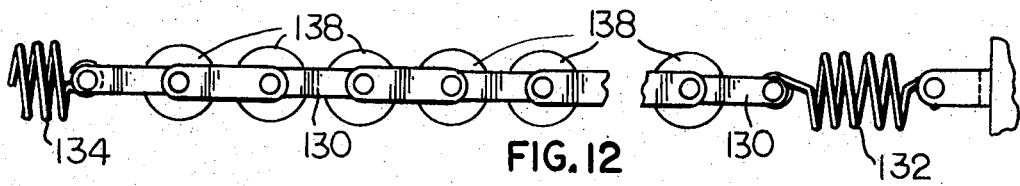
FIG. 12 is an enlarged detail view of one length of bearing elements of the kind shown in FIG. 11.

Referring next to the embodiment of FIG. 11 and 12, in place of a retainer sleeve, there can be used a series of bearing lengths, each length comprising a plurality of articulated links 130 which join adjacent bearing elements disposed linearly along the shaft 50 with ends of the lengths stretched between opposed springs 132, 134. The springs are used to maintain the linearity of the bearing elements, and also, by means of holding them in stretched condition maintains them against the shaft 50 as indicated in FIG. 11. The limits of travel of the apparatus are defined by the travel of the bushing relative to the individual bearing elements 138 and of the conjoined bearing elements 138 relatively to the shaft 50. In this way, both movements are additive in increasing the permissible stroke of the machine.

Still referring to FIGS. 11 and 12, the bearing elements 138 are arranged in a plurality of rows of bearing elements disposed circumferentially around the shaft 50 and each row of respective bearing elements is held in position by its respective pair of helical springs acting against the opposite ends of the respective rows of bearing elements. The bearing elements both permit movement of the bushings thereon and also provide that the bushings can move relatively to the shaft by reason of the entirety of the rows moving to the right and to the left in the same way that the retainer sleeve in the prior embodiments moved relatively to the shaft.

The limits of movement for the carriage are defined by spaced stops 60, each having abutment surfaces 66, the stop being adjustable along the length of the shaft by means of an adjuster screw 62 which bears against the shaft to hold the stop in its adjusted position.

In each of the described embodiments, the available travel for the carriage is increased by reason of the bearing elements providing direct antifriction rolling engagement with the bushing and also providing that the cage for the bearing elements is itself movable but within limits so that the bushing and retainer sleeve are always maintained in assembled relationship.

Referring to FIG. 16, one of the members may be flat and they engage opposite cylindrical sections of bearing elements as indicated in FIG. 16.

Referring to FIG. 17 the grooves or tracks may be used to effect turning of the bearing elements so that they will not track over the same surfaces of the opposed bearing member in order to prevent undue wear of the bearing members.

Figure 13:
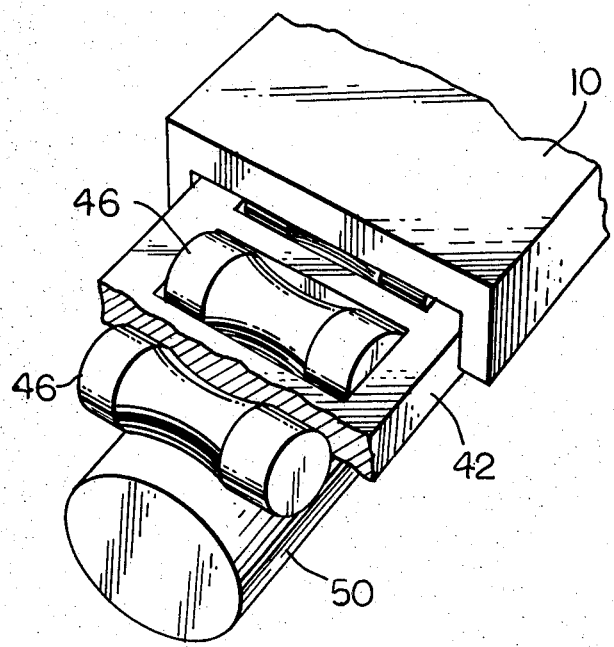
FIG. 13 is an enlarged isometric detail view of a bearing arrangement in which the bearing elements are adapted to transfer load between flat and curved surfaces.

The section of the track which effects the turning of the inner bearing element is so located that the turning is accomplished after the bearing elements are moved out of engagement with an opposed bearing surface. For example, referring to FIG. 13 which illustrates how the groove terminates in an arc-shaped groove which serves as a cam for the pin on the inner bearing member causing it to be turned at the terminal section of the bearing movement.

One of the important features of the present invention which has been accomplished as demonstrated from the foregoing description, is that a smaller construction bearing can be provided which fully meets all of the load requirements for the apparatus while under a condition of full load and at the same time permits a substantial extent of travel whereby the machine can index at its low load or no load position at the end of the travel.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents of the invention.

What I claim is:

1. An improved bearing construction comprising a carriage having a work load thereon, a plurality of spaced bushing members combined with said carriage to provide spaced supports, said bushings each having a bore for permitting movement therethrough, a plurality of bearing cages and a plurality of bearing elements disposed in respective ones of said cages and providing antifriction rolling support for said bushing at angularly spaced location thereon, and a support member extending through said cage to provide bearing support for said bushing, and means for defining the extent of relative movement between said bushing and its coating bearing cages whereby said carriage is movable through an extent which is a composite of bushing travel relatively to said cages and cage travel relatively to said support member and wherein said cages are comprised of a plurality of linkages having a plurality of articulated linkages coupling successive bearing elements to maintain their relative spacing.

2. The bearing construction in accordance with claim 1 including resilient means for retaining the opposite ends of interconnected bearing elements whereby said bearing elements and cages are yieldably movable in unison during each direction of travel of said carriage.